US012582179B2

(12) United States Patent
Wilkinson et al.

(10) Patent No.: US 12,582,179 B2
(45) Date of Patent: Mar. 24, 2026

(54) ANTIMICROBIAL DYES FOR FACEMASKS

(71) Applicant: BMG (British Medical Group) Limited, Cambridge (GB)

(72) Inventors: Mark Wilkinson, Cambridge (GB); Paul Wight, Manchester (GB)

(73) Assignee: BMG (British Medical Group) Limited, Cambridge (GB)

( * ) Notice: Subject to any disclaimer, the term of this patent is extended or adjusted under 35 U.S.C. 154(b) by 1006 days.

(21) Appl. No.: 17/624,141

(22) PCT Filed: Jul. 1, 2020

(86) PCT No.: PCT/EP2020/068558
§ 371 (c)(1),
(2) Date: Dec. 30, 2021

(87) PCT Pub. No.: WO2021/001441
PCT Pub. Date: Jan. 7, 2021

(65) Prior Publication Data

US 2022/0363906 A1 Nov. 17, 2022

(30) Foreign Application Priority Data

Jul. 1, 2019 (EP) .................................... 19183701

(51) Int. Cl.
*A41D 13/11* (2006.01)
*A01N 25/30* (2006.01)
*C09B 47/06* (2006.01)
*C09B 47/32* (2006.01)

(52) U.S. Cl.
CPC .......... *A41D 13/1192* (2013.01); *A01N 25/30* (2013.01); *C09B 47/06* (2013.01); *C09B 47/32* (2013.01)

(58) Field of Classification Search
CPC ......... C09B 47/06; C09B 47/32; A01N 43/90; A01N 25/00; A01N 59/16; D06P 1/14
See application file for complete search history.

(56) References Cited

U.S. PATENT DOCUMENTS

| | | | | |
|---|---|---|---|---|
| 5,486,274 | A | 1/1996 | Thetford et al. | |
| 12,049,095 | B2 | 7/2024 | Wight et al. | |
| 2003/0157150 | A1 | 8/2003 | Lee | |
| 2009/0235429 | A1 | 9/2009 | Pickard et al. | |
| 2010/0221307 | A1* | 9/2010 | Matsushita | D06M 16/00 424/443 |
| 2012/0056929 | A1 | 3/2012 | Sao et al. | |
| 2016/0058921 | A1 | 3/2016 | Gros | |
| 2016/0159992 | A1 | 6/2016 | Foo et al. | |
| 2018/0105710 | A1 | 4/2018 | Hong et al. | |
| 2022/0356364 | A1 | 11/2022 | Wight et al. | |
| 2022/0363906 | A1* | 11/2022 | Wilkinson | D06P 1/14 |
| 2022/0386724 | A1 | 12/2022 | Wilkinson et al. | |
| 2023/0147289 | A1 | 5/2023 | Wight | |

FOREIGN PATENT DOCUMENTS

| | | | | |
|---|---|---|---|---|
| CN | 1189987 | A | 8/1998 | |
| CN | 101932328 | A * | 12/2010 | D06P 3/6008 |
| CN | 104910553 | A | 9/2015 | |
| CN | 115464988 | A | 12/2022 | |
| EP | 0815880 | A2 | 1/1998 | |
| JP | H05147127 | A | 6/1993 | |
| JP | 2005009065 | A * | 1/2005 | |
| JP | 2007/118252 | A | 5/2007 | |
| JP | 5885917 | B2 | 3/2016 | |
| WO | WO-93/00815 | A1 | 1/1993 | |
| WO | WO-98/30094 | A1 | 7/1998 | |
| WO | WO-9949823 | A1 * | 10/1999 | A01N 25/10 |
| WO | WO-2007/000473 | A1 | 1/2007 | |
| WO | WO-2010/118180 | A1 | 10/2010 | |
| WO | WO-2010/138426 | A1 | 12/2010 | |
| WO | WO-2015/154543 | A1 | 10/2015 | |
| WO | WO-2017/148957 | A1 | 9/2017 | |
| WO | WO-2018/091774 | A1 | 5/2018 | |

OTHER PUBLICATIONS

"Photophysical properties of nonperipherally and peripherally substituted triazatetrabenzcorrole phosphorus dihydroxy and singlet oxygen generation", Journal of Photochemistry and Photobiology A: Chemistry vol. 215, pp. 96-102, Xian-Fu Zhang et. al., Aug. 6, 2010. (Year: 2010).*
Gaspard et al., "Studies on photoinactivation by various phthalocyanines of a free or replicating non-enveloped virus," Journal of Photochemistry and Photobiology B: Biology 31.3 (1995): 159-162.
U.S. Appl. No. 18/009,144, Published
U.S. Appl. No. 17/624,146, Issued.
U.S. Appl. No. 17/624,154, Published.
Database WPI Week 201581 Thomson Scientific, London, GB; AN 2015-70932N XP0027996537 (2015).
Extended European Search Report for EP Application No. 19183702.0 dated Feb. 6, 2020.
Extended European Search Report for EP Application No. 19183703.8 dated Jan. 17, 2020.
Extended European Search Report for EP Application No. 19183704.6 dated Jan. 8, 2020.
International Search Report and Written Opinion and International Application No. PCT/EP2020/068559 dated Oct. 13, 2020.
International Search Report and Written Opinion and International Application No. PCT/EP2020/068562 dated Sep. 23, 2020.
International Search Report and Written Opinion and International Application No. PCT/EP2020/068568 dated Nov. 25, 2020.
Extended European Search Report for EP Application No. 19187301.2 dated Jun. 26, 2020.
Hamdi et al., "Synthesis of Novel Antibacterial Metal Free and Metallophthalocyanines Appending With Four Peripheral Coumarin Derivatives and Their Separation of Structural Isomers," Heterocycles, 87(11): 2283 (2013).
International Search Report and Written Opinion and International Application No. PCT/EP2020/068558 dated Sep. 4, 2020.

(Continued)

*Primary Examiner* — Sophie Hon
(74) *Attorney, Agent, or Firm* — Foley Hoag LLP; David P. Halstead; Alexander J. Chatterley

(57) ABSTRACT

A printing process for printing with ink an image on a glove formed by a dipping process, wherein the image is first printed on a former and transferred to the glove during dipping.

17 Claims, 1 Drawing Sheet

(56) References Cited

OTHER PUBLICATIONS

Saki et al., “Synthesis and characterization of novel quaternized 2, 3-(diethylmethylamino)phenoxy tetrasubstituted Indium and Gallium phthalocyanines and comparison of their antimicrobial and antioxidant properties with different phthalocyanines,” Inorganic Chemistry Communications, 95: 122-129 (2018).

* cited by examiner

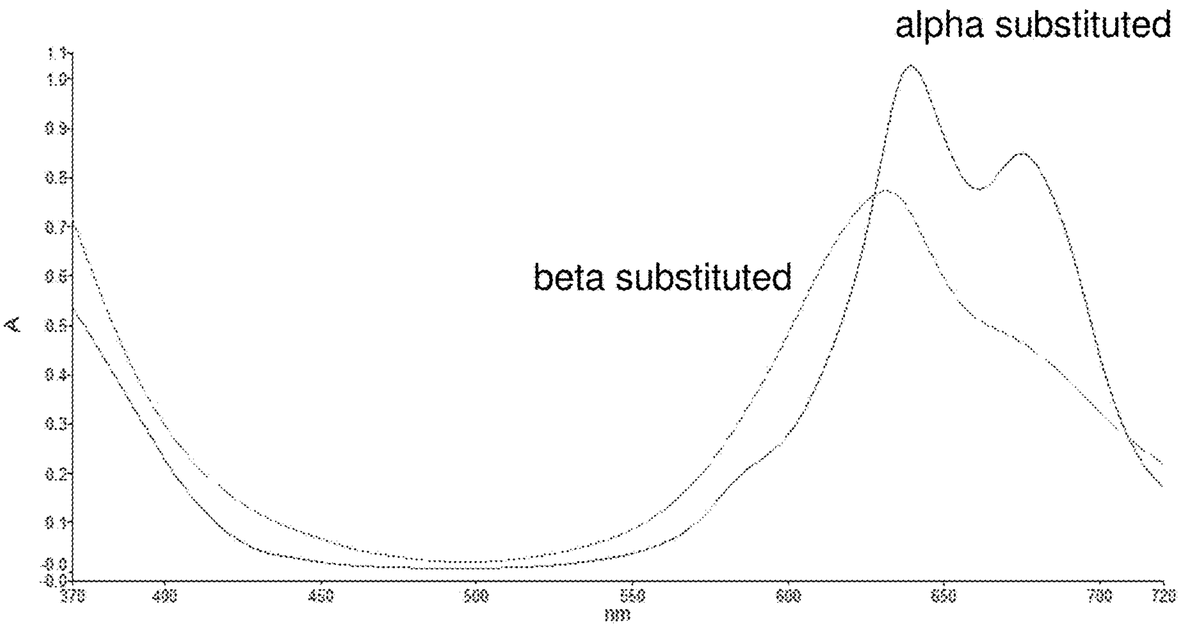
alpha substituted
beta substituted
A
nm

ANTIMICROBIAL DYES FOR FACEMASKS

CROSS-REFERENCE TO RELATED APPLICATION

This application is a National Stage Application of International Patent Application No. PCT/EP2020/068558, filed Jul. 1, 2020, which claims the benefit of European Application No.: 19183701.2, filed Jul. 1, 2019.

FIELD OF INVENTION

The present invention relates to an antimicrobial facemask and process for the manufacture thereof.

BACKGROUND OF THE INVENTION

Recently, the cost to society associated with Hospital Acquired Infections (HAI) has significantly increased. There is a general need to control infective agents, especially in healthcare settings. To protect health workers, and to minimise the risk of cross contamination between patients and healthcare workers it is desirable to engender antimicrobial properties to routine protective equipment, such as facemasks.

Facemasks are typically made up of multiple layers. These layers can be made from a variety of materials such as polypropylene, polyester or cellulose. A filtration element may trap infective agents such as bacterial and viruses, but unless they are rapidly killed they may grow and become a further contaminating source.

Singlet oxygen is highly attractive as an antimicrobial agent because due to its potent and non-selective mechanism of action towards microbes. Crucially there is no reported example of the development of resistance to singlet oxygen by microorganisms. However, commonly used singlet oxygen generators can still present issues of solubility, aggregation, singlet oxygen generating efficiency, overall unsatisfactory antimicrobial activity and stability.

WO1999049823 claims anti-bacterial fabrics, but not facemasks. It prefers metal free dyes, and gives examples of porphyrins.

JP2005009065 claims a medical mask with antibacterial properties given by phthalocyanine blue. Phthalocyanine blue is a copper phthalocyanine pigment, which is highly aggregated. It does not detail non-woven fabrics.

There is a need to develop suitable singlet oxygen generators to engender facemasks with effective and efficient antimicrobial activities which are safe for the user.

SUMMARY OF THE INVENTION

The present invention identifies certain dyes that are suitable for depositing on fibres (for example polypropylene, polyethylene, polyester, nylon or cellulose) that may be used to construct facemasks, and demonstrates their antimicrobial properties.

In particular, the present invention provides an antimicrobial facemask comprising a singlet oxygen generating photosensitising dye. The present invention further provides a process for treating a fabric suitable for a facemask construction with a singlet oxygen generating dye.

BRIEF DESCRIPTION OF THE DRAWINGS

FIG. 1 shows a comparison of the UV/vis absorption spectra for phthalocyanine I compared to an analogue having the oxypyridinium residue attached to the phthalocyanine core in the beta position (positions 3, 6, 11 and 14 in Formula 1).

DETAILED DESCRIPTION OF THE INVENTION

The present invention relates to the application of certain dyes as generators of singlet oxygen, a method for their application to materials suitable for facemask construction, and an antimicrobial facemask comprising said dye. The dye of the present invention is cationic or anionic, rendering the dye water soluble. Cationic dyes are preferred and have been found to have an unexpected affinity for fabrics (e.g. cellulose, polyester, nylon), enabling their efficient deposition without chemical attachment, and additionally sufficient water solubility to enable dyeing.

The antimicrobial facemask may comprise at least one layer of nonwoven fabric, for example meltblown or spunbond formed polypropylene, polyethylene, polyester, cellulose or nylon, onto which is deposited a singlet oxygen generating photosensitising dye. Especially preferred is where the facemask comprises or consists of a non-woven fabric.

In this respect, the fabric or material of the facemask may incorporate the singlet oxygen generating photosensitising dye. “Incorporate” may include the concepts of coated, impregnated or dyed.

Preferably the mask is comprised of multiple layers, which may or may not be identical.

Preferably, the mask comprises at least two fabric layers affixed together, even more preferably four layers (antimicrobial layers, filtration layers and facial contact layer).

Singlet oxygen generators are known to destroy microorganisms. Singlet oxygen has a greater energy than ground-state, triplet oxygen. The singlet and triplet states of oxygen are distinguished by the singlet state having two electrons of anti-parallel spins and the triplet state having an uncoupled pair of electrons with parallel spins. The singlet oxygen is also distinguished from triplet oxygen because it is a highly reactive species with a lifetime from a few microseconds to several hundred microseconds. During its lifetime singlet oxygen has the potential to react before being deactivated, and therefore has a wide number of applications, including antimicrobial applications such as in medical gloves and facemasks.

Dyes may be selected from structural classes such as phthalocyanines, porphyrins, dipyrrole-boron complexes (BODIPY), phenothiazines (e.g. Methylene Blue) and fluoresceins (e.g. Rose Bengal).

The preferred dye of the present invention is a phthalocyanine. Preferably the phthalocyanine is alpha substituted. Alternatively preferred is the phenothiazine class of dyes, for example Methylene Blue.

In accordance with the present invention, the phthalocyanine nucleus may be aluminum, titanium or zinc. If aluminium or titanium is used, the metal may be further substituted by alkyl, aryl, alkoxy, hydroxy or halogen. Aluminium, titanium and zinc are chosen because they are more efficient in generating singlet oxygen than other metals such as copper or nickel, and they are reasonably small and so can be inserted into the phthalocyanine easily, with the reactions occurring under air, in good yield, as opposed to other metals such as using $SiCl_4$, and are easily available in bulk. The central metal atom also influences the position of the absorption maximum of the phthalocyanine. Zinc, titanium and aluminium are preferred in the compounds because their absorption is in the visible region of the spectrum especially between 600-700 nm. The zinc compounds described herein are especially preferred.

For the phthalocyanines of the present invention each of the pendant organic radicals linked to the phthalocyanine nucleus may be any aromatic or heteroaromatic moiety. Any one phthalocyanine nucleus may carry two or more different organic radicals. This radical may be linked to the phthalocyanine core by a carbon or hetero-atom bridge. Examples include, but are not limited to oxygen linked phenyl, pyridyl and N-alkylated pyridinium, Examples of N-alkylated pyridines are 3-hydroxy-1-methylpyridin-1-ium, 3-hydroxy-1-ethylpyridin-1-ium, 3-hydroxy-1-propylpyridin-1-ium.

Further, the phthalocyanines used in the present invention may have substituents to the phthalocyanine nucleus in the alpha position, adjacent to the phthalocyanine nucleus. This alpha substitution decreases aggregation of the phthalocyanine. Aggregation is known to reduce singlet oxygen generation efficiency, and therefore this structure prevents aggregation and increases efficiency singlet oxygen generation and hence antimicrobial and other activity. In addition, after extensive research the present inventors have realised the molecules described herein have other desirable properties. They are more thermally stable, and stable to radical degradation than commercially available analogs such as Tinolux BBS and Tinolux BMC.

The phthalocyanine according to the present invention has a structure with the following formula:

Formula 1

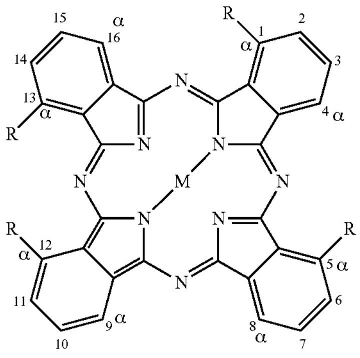

$X^-$(b)

wherein:

M is selected from aluminium, titanium or zinc,

R=R'(a) or R"(b)

R'=Oxygen linked phenyl or pyridyl

R"=Oxygen linked phenyl, pyridyl or N-alkylated pyridinium, and a+b=4 b=1 to4

X=$Cl^-$, $Br^-$, $I^-$, methanesulphonate, ethanesulphonate, formate, acetate or other inorganic or organic counterion or mixture thereof;

and wherein alkylation on the pyridine nitrogen is optionally branched C1-C8 alkyl. This alkyl chain may be hydroxylated or fluorinated.

Most preferred are the zinc pthalocyanines illustrated below—

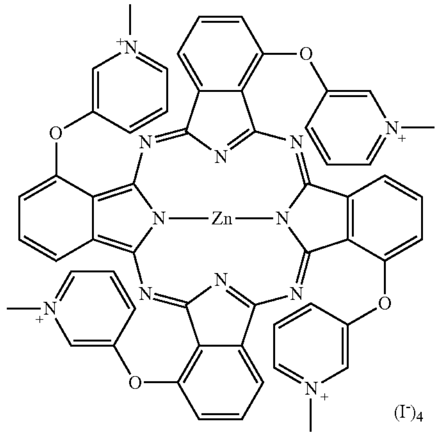

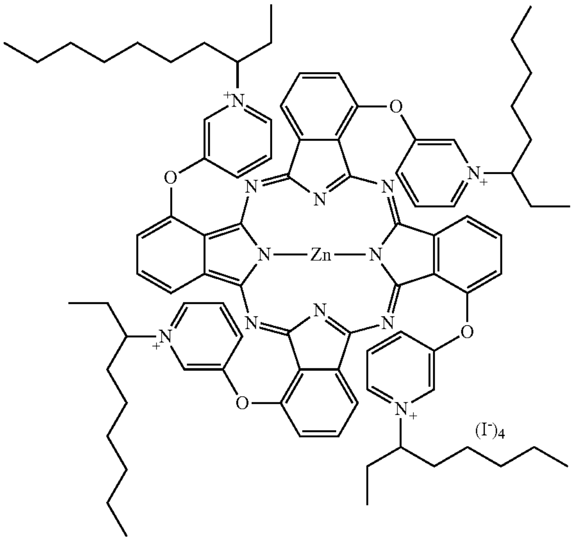

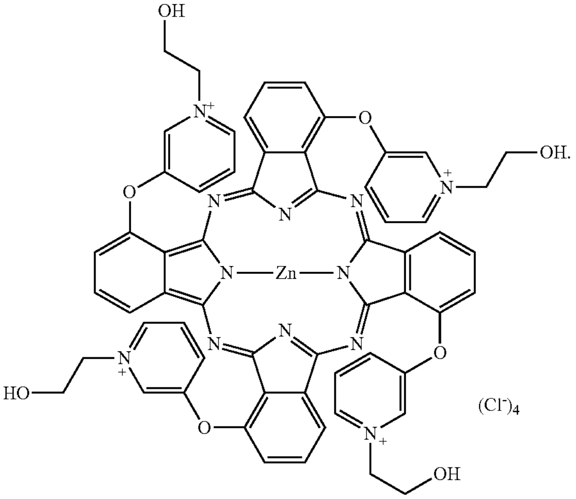

The phthalocyanines used in the present invention are activated by light and offer a sustained release of singlet oxygen onto the facemask. It is known that singlet oxygen is a strong antimicrobial agent, killing most bacteria. The advantage of singlet oxygen generating dyes is that they are catalytic and not exhausted over time, and the singlet oxygen they release is not persistent, due it its very short half-life of typically a few microseconds. This has major advantages in toxicity and potential for development of resistant organisms. The short lifetime and hence short diffusion range of singlet oxygen gives this invention a significant advantage in safety for users.

Further, the phthalocyanines preferred in the present invention have substituents to the phthalocyanine nucleus in the alpha position, adjacent to the phthalocyanine nucleus (positions 1,5,12 and 13 in Formula 1). This alpha substitution decreases aggregation of the phthalocyanine. Aggregation is known to reduce singlet oxygen generation efficiency, and therefore this structure prevents aggregation and increases efficiency of singlet oxygen generation and hence antimicrobial and other activity. To demonstrate this, phthalocyanine I was compared to an analogue where the oxy-pyridinium residue was attached to the phthalocyanine core in the beta position (positions 3,6,11 and 14 in Formula 1). 25 mgs of each were dissolved in 1 L water, and the UV/vis absorption compared. It can be seen in the spectra in FIG. 1 that the alpha substitution pattern results in much high population of the monomeric phthalocyanine (ca. 675 nm here) compared to the aggregated phthalocyanine (ca. 640 nm here) than is the case for the beta substitution, which favours the aggregate (ca. 635 nm here).

This use of alpha substitution is therefore novel and inventive over beta substitution pattern.

The phthalocyanines of Formula 1 can be prepared by reacting:

(1) a substituted 1,2-dicyanobenzene of Formula 2:

Formula 2

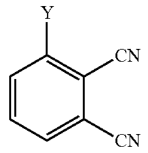

Y = F, Cl, BrI, $NO_2$ wherein Z is selected from chloro, bromo and iodo or nitro and is in the 3 position (alpha) to one of the CN groups, with (2) a compound aryl-OH whereby the group Z, is replaced by aryl-O groups to form a compound of Formula (3). Pyridyl is illustrated for example, but this may be phenyl or other hetero aromatic.

Formula 3

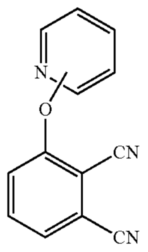

This can then be followed by reaction of one or more 1,2-dicyanobenzene compounds of Formula 3 with an appropriate metal or metal salt optionally in an inert liquid at an elevated temperature to form a phthalocyanine of Formula 1.

Such reactions are fully described in GB 1489394, GB 2200650 and DE 2455675.

If an N-alkyl derivate is desired, then the alkylation of the pyridine groups is done last. If the alkylation process is not done to completion, some of the pyridyl substituents can remain unalkylated and uncharged. The process can be modified by temperature and stoichiometry to give higher or lower degrees of final alkylation.

The antimicrobial phthalocyanines illustrated in present invention can be used to coat fibres suitable for facemask manufacture and can provide effective and continuous antimicrobial protection. In addition, the physical properties of the mask are not significantly reduced.

The phthalocyanines used can be applied to any material suitable for facemask construction. Examples are, but not limited to polypropylene, polyester or cellulose. The application of the phthalocyanines to the fibres may be achieved via a wide variety of methods familiar to those skilled in the art of textile dyeing. Examples may include, but are not limited to—

1) Treatment of the fibres with a solution of the dye in an organic solvent or water
2) Treatment of the fibres with a slurry of the dye in an organic solvent or water, combined with appropriate co-factors, surfactants and processing conditions (e.g. time, temperature) to achieve dyeing A particular advantage of the phthalocyanines preferred in this invention is their high solubility in selected solvents which allow facile dyeing of the desired fibres.

The inventors have discovered that application of the photosensitising phthalocyanines as solutions is a particular advantage of the invention as it maintains the phthalocyanine in a de-aggregated state (in contrast to slurries, suspensions or dispersions). Aggregation is known to decrease the generation of singlet oxygen by photosensitisers. As such, the photosensitiser may be applied at a low weight loading per square meter of fabric, whilst still giving high antimicrobial activity.

In addition to the photosensitising dye, a homo or heteropolymer of unsaturated low molecular weight carboxylic acids (or their esters or anhydrides) may also be deposited onto facemask material, such as the non-woven fabric. Example monomers include acrylic, methacrylic or maleic acids, and example polymers include the carbomer class, such as acrylic acid homopolymers, or maleic acid/vinyl ether heteropolymers. Preferably the carboxylic acid polymer is deposited on the same fabric layer as the photosensitiser, being the outer layer of the mask. Preferably the homo or heteropolymer may be deposited on the fabric first, enabling deposition of the dye without chemical attachment.

Additionally, or alternatively a surfactant may also be included. Preferably the surfactant is an ionic, or alternatively a betaine type surfactant. Preferred is an ionic sulfonated aryl surfactant, such as an alkylbenzene sulfonate.

While the invention has been described in terms of what is presently considered to be the most practical and preferred embodiments, it is to be understood that the invention needs not be limited to the disclosed embodiments. On the contrary, it is intended to cover various modifications and similar arrangements included within scope of the appended claims which are to be accorded with the broadest interpretation so as to encompass all such modifications and similar structures.

The present invention will now be illustrated, but in no way limited, by reference to the following examples.

Example 1—Preparation of 3-(pyridyloxy)phthalocyanine

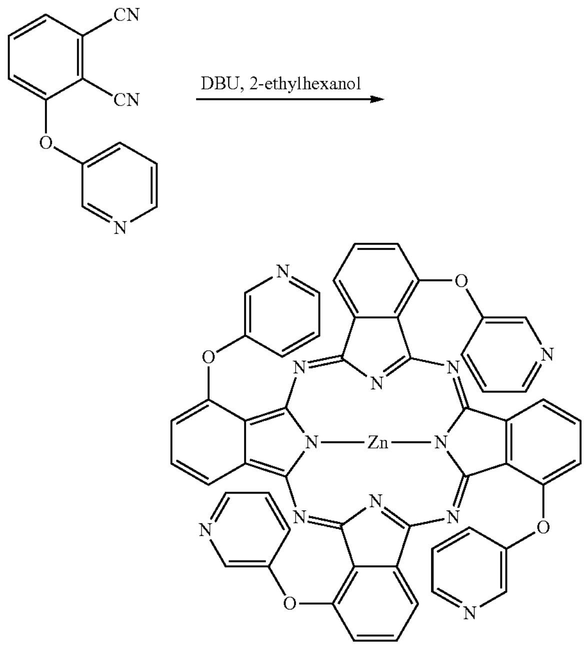

To 2-ethylhexanol (242 g) is charged 3-(oxypyridylphthalonitrile (145 g, 0.656 moles, 1 eq), and the vessel purged with inert gas. Zinc chloride is charged (21 g, 0.154 moles, 94% of theoretical charge) followed by DBU (51 g, 0.335 moles, 0.51 eq). The reaction is heated to ca. 107° C. (internal vessel temp) for at least 16 hours. The reaction is cooled and isopropyl alcohol (1600 mL) charged to the reaction mixture. After cooling to room temperature, the product is isolated by filtration and washed with further iso-propanol, then dried in an oven.

Example 2—Preparation of tetra-methyl (pyridiniumoxy) phthalocyanine iodide

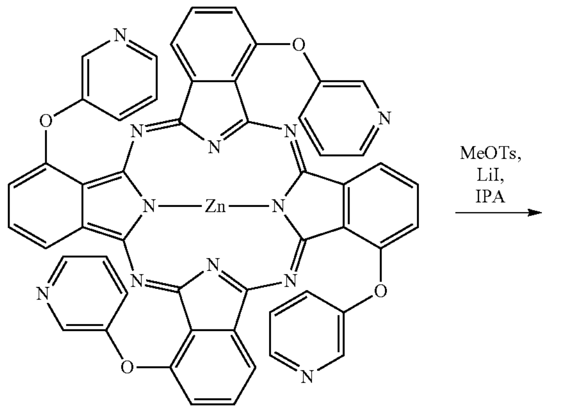

-continued

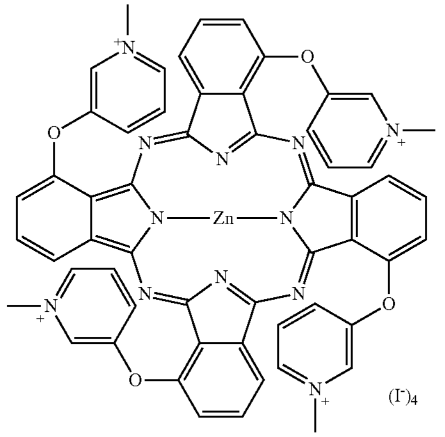

To NMP (360 g) is charged pyridyl zinc phthalocyanine prepared in Example 1 (140 g, 1 eq, 0.147 mol) and methyl p-tolueneslufonate (120 g, 0.644 mol, 4.4 eq). The reaction is stirred and heated to 107-111° C. (internal vessel temperature) for 20 h, then cooled to 50-60° C. (internal). Meanwhile, to a second vessel is charged iso-propanol (14 vols, 2000 mL) and lithium iodide trihydrate (125 g, 0.668 mol, 4.54 eq). The reaction mixture is transferred to the second vessel to precipitate the crude product, which is isolated by filtration and washed with further iso-propanol. The wet cake of the crude product is recharged to a vessel with iso-propanol (8 vols, 1100 mL) and lithium iodide trihydrate (35 g, 0.187 mol, 1.27 eq). The slurry is heated to 80-83° C. (internal), then cooled to room temperature. The final product is isolated by filtration and washed with further iso-propanol, before being dried in an oven.

Example 3—Preparation of tetra-(2-ethylhexyl) (pyridiniumoxy)phthalocyanine iodide

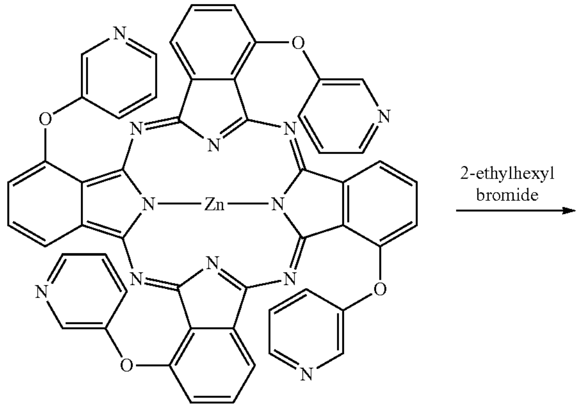

-continued

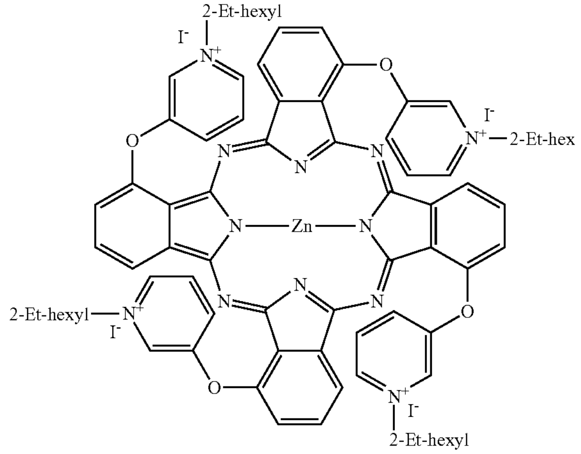

To NMP (10 g) is charged pyridyl zinc phthalocyanine prepared in Example 1 (5 g, 1 eq, 0.0053 mol) and 2-ethylhexyl bromide (6.09 g, 0.0315 mol, 6 eq). The reaction is stirred and heated to 110° C. (oil bath temperature) for 27 h, then cooled to 70° C. (bath). Meanwhile, to a second vessel is charged iso-propanol (150 mL) and sodium iodide (3 g, 0.02 mol, 3.8 eq). The reaction mixture is transferred to the second vessel to precipitate the crude product, which is isolated by filtration and washed with further iso-propanol. The wet cake is recharged to a vessel with iso-propanol (150 ml) and sodium iodide (1 g, 0.0067 mol, 1.27 eq). Water (15 ml) is added, and the slurry heated to 40° C. for 3 h, then cooled to room temperature and further stirred. The product is isolated by filtration, then washed with iso-propanol/water, then finally washed with further iso-propanol before being dried in an oven.

Example 4—Preparation of tetra-(1-hydroxyethyl)(pyridiniumoxy)phthalocyanine chloride

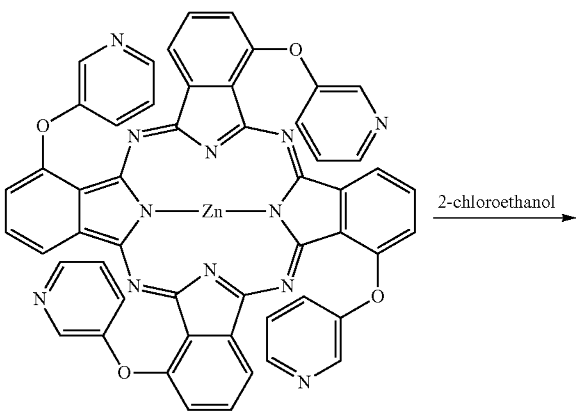

-continued

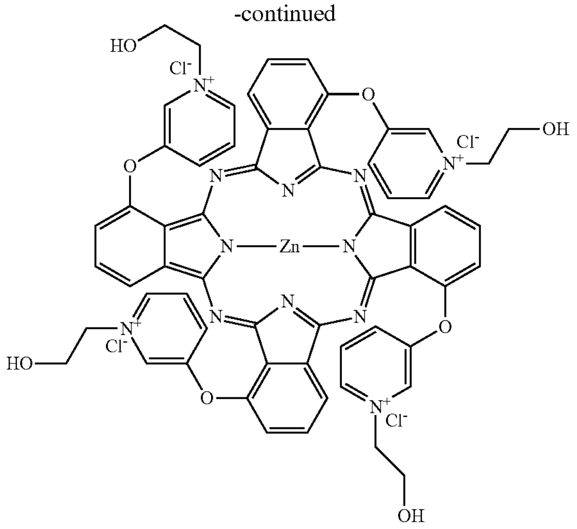

To NMP (16 g) is charged pyridyl zinc phthalocyanine prepared in Example 1 (8 g, 1 eq, 0.0084 mol) and 2-chloroethanol (4.07 g, 0.05 mol, 6 eq). The reaction is stirred and heated to 110° C. (oil bath temperature) for 23 h, then cooled to 70° C. (bath). Further 2-chloroethanol (1.36 g, 0.017 mol, 2 eq) is added, followed by sodium iodide (0.06 g, 0.0004 mol, 0.05 eq) and the reaction heated to 110° C. (bath) for a further 17 h, then cooled to 70° C. (bath). Meanwhile, to a second vessel is charged iso-propanol (200 mL). The reaction mixture is transferred to the second vessel to precipitate the crude product, which is isolated by filtration and washed with further iso-propanol before being dried in an oven.

Example 5—Dyeing Fabric with Solution of Example 2 in Methanol 0.025 g of the phthalocyanine prepared in Example 2 was dissolved in 100 ml of methanol. An 10×10 cm square of non-woven polypropylene fabric (suitable for mask construction) was immersed in the solution for 15 seconds with swirling. The sample was carefully removed from the liquid, allowing the excess to run off. The sample was air dried.

Example 6—Dyeing Fabric with Solution of Example 3 in Acetone 0.025 g of the phthalocyanine prepared in Example 3 was dissolved in 1 ml NMP and made up to 100 ml with acetone. An 10×10 cm square of non-woven polypropylene fabric (suitable for mask construction) was immersed in the solution for 15 seconds with swirling. The sample was carefully removed from the liquid, allowing the excess to run off. The sample was air dried.

Example 7—Dyeing Fabric with Solution of Example 4 in Methanol 0.025 g of the phthalocyanine prepared in Example 4 was dissolved in 100 ml of methanol. An 10×10 cm square of cellulose fabric (suitable for mask construction) was immersed in the solution for 30 minutes, then heated to 68° C. The sample was carefully removed from the liquid, allowing the excess to run off. The sample was air dried.

Example 8

0.025 g of the phthalocyanine prepared in Example 2 was dissolved in 100 ml of water. 2.5 g of this solution was made up to 15 g. An 18×18 cm square of non-woven cellulose fabric (suitable for mask construction) was immersed in the solution for 25 minutes with occasional agitation. Heating may be employed if increased dye deposition is desired. The sample was carefully removed from the liquid, allowing the excess to run off. The sample was air dried. Next the dried square was treated with a suspension of 10 mgs of an acrylic acid homopolymer (for example Carbopol 971) and a 5 mgs of sodium dodecylbenzenesulfonate in 10 g water. The square was treated for 1 min, then the sample was carefully removed from the liquid, allowing the excess to run off. The sample was air dried.

Example 9

0.025 g of the Methylene Blue (CAS 61-73-4) was dissolved in 100 ml of water. 2.5 g of this solution was made up to 15 g. An 18×18 cm square of non-woven cellulose fabric (suitable for mask construction) was immersed in the solution for 25 minutes with occasional agitation. Heating may be employed if increased dye deposition is desired. The sample was carefully removed from the liquid, allowing the excess to run off. The sample was air dried. Next the dried square was treated with a suspension of 10 mgs of an acrylic acid homopolymer (for example Carbopol 971) and a 5 mgs of sodium dodecylbenzenesulfonate in 10 g water. The square was treated for 1 min, then the sample was carefully removed from the liquid, allowing the excess to run off. The sample was air dried.

Example 10

An 18×18 cm square of non-woven polypropylene fabric (suitable for mask construction) was treated with a suspension of 10 mgs of an acrylic acid homopolymer (for example Carbopol 971) and 5 mgs of sodium dodecylbenzenesulfonate in 10 g water. The square was treated for 1 min, then the sample was carefully removed from the liquid, allowing the excess to run off. The sample was air dried. Next, 0.025 g of the phthalocyanine prepared in Example 2 was dissolved in 100 ml of water. 2.5 g of this solution was made up to 15 g. The square above was treated with this dye solution for 1 min, then the sample was carefully removed from the liquid, allowing the excess to run off. The sample was air dried.

Example 11

0.025 g of the phthalocyanine prepared in Example 2 was dissolved in 100 ml of water. To 75 ml of this solution was added 150 mgs of an acrylic acid homopolymer (for example Carbopol 971) and 75 mgs of sodium dodecylbenzenesulfonate. The suspension was stirred until fully dispersed. An 18 cm square of non-woven polypropylene fabric was dipped in this suspension for 2 min, then the sample was carefully removed from the liquid, allowing the excess to run off. The sample was air dried.

Example 12—Microbiology Performance of Above Fabrics

A 4 cm disc of the sample prepared in Example 5 was inoculated with a 0.1 ml presentation of either *Staphylococcus aureus* ("Staph a") or *Klebsiella pneumonia* ("Kleb b"). After 1 h at 37° C. under illumination of 1500 lux, a reduction of 5.5 Log was achieved for Staph a and 2.1 Log for Kleb p.

The invention claimed is:

1. An antimicrobial facemask comprising a singlet oxygen generating photosensitising dye, wherein the dye is cationic or anionic;

wherein the photosensitising dye comprises a phthalocyanine of Formula 1:

Formula 1

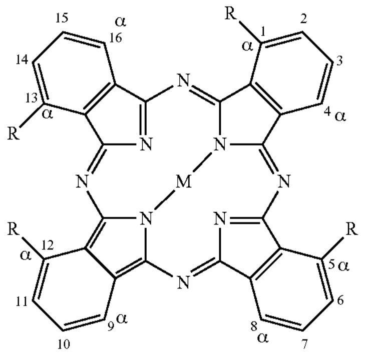

$X^-(b)$ wherein:

M is aluminium, titanium or zinc,

R is R' or R"; and at least one R is R";

wherein:

R' is selected from oxygen-linked phenyl or pyridyl,

R" is oxygen-linked N-alkylated pyridinium, and $X^-$ is $Cl^-$, $Br^-$, $I^-$, methanesulphonate, ethanesulphonate, formate, acetate, derivatives thereof, or a mixture thereof; and wherein the alkylation on the pyridine nitrogen is an optionally branched C1-C8 alkyl group, the C1-C8 alkyl group is optionally hydroxylated or fluorinated; and there is a mean average of b occurrences of R" with a corresponding mean average of b occurrences of $X^-$, in which b=1 to 4.

2. The facemask according to claim 1, wherein the phthalocyanine is a zinc phthalocyanine.

3. The facemask according to claim 1, wherein the phthalocyanine is any of the following:

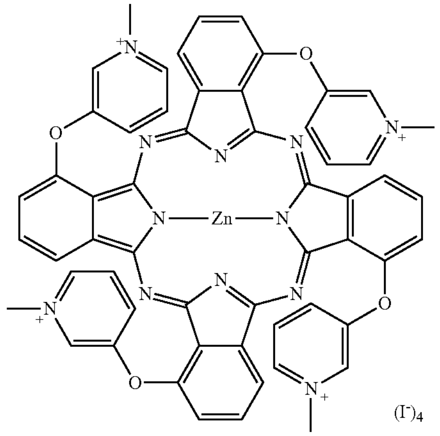

$(I^-)_4$

-continued

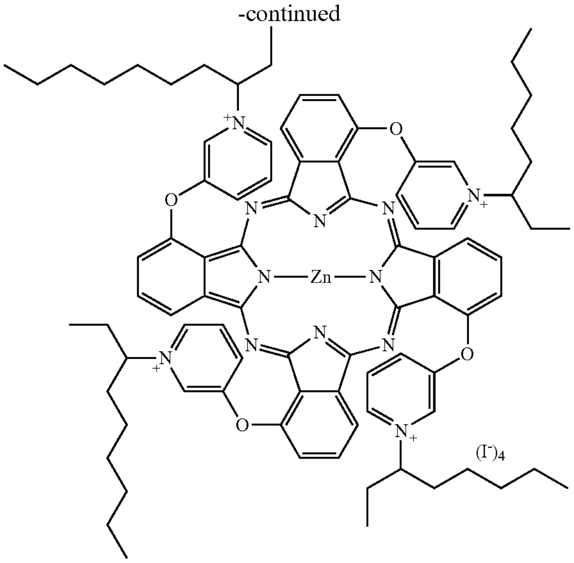

(I⁻)4

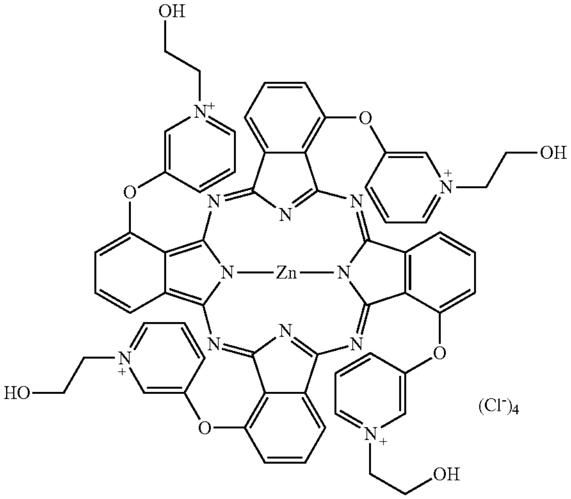

(Cl⁻)4

4. The facemask according to claim 1, further comprising a homo or heteropolymer of unsaturated low molecular weight carboxylic acids or their esters or anhydrides.

5. The facemask according to claim 4, wherein the monomer of the homopolymer or one monomer of the heteropolymer of unsaturated low molecular weight carboxylic acids or their esters or anhydrides is an acrylic, methacrylic or maleic acid.

6. The facemask according to claim 4, wherein the homo or heteropolymer of unsaturated low molecular weight carboxylic acids or their esters or anhydrides is in the carbomer class.

7. The facemask according to claim 4, wherein the dye is a zinc phthalocyanine.

8. The facemask according to claim 1, further comprising a surfactant.

9. The facemask according to claim 8, wherein the surfactant is an ionic sulfonated aryl surfactant.

10. The facemask according to claim 1, wherein the mask comprises at least two fabric layers affixed together.

11. A process for construction of the facemask according to claim 1, comprising a step of treating a fabric suitable for the facemask construction with the phthalocyanine.

12. The process according to claim 11, wherein the phthalocyanine is in solution form.

13. The process according to claim 12, comprising a phthalocyanine solution loading of 0.001-0.1 g/square meter of fabric.

14. A process for construction of the facemask according to claim 2, comprising a step of treating a fabric suitable for the facemask construction with the phthalocyanine.

15. A process for construction of the facemask according to claim 3, comprising a step of treating a fabric suitable for the facemask construction with the phthalocyanine.

16. The facemask according to claim 6, wherein the polymer is selected from acrylic acid homopolymers and maleic acid/vinyl ether heteropolymers.

17. The facemask according to claim 7, wherein the homo or heteropolymer of unsaturated low molecular weight carboxylic acids is deposited on the same fabric layer as the photosensitizing dye.

* * * * *